United States Patent [19]

Theurer et al.

[11] 4,008,369
[45] Feb. 15, 1977

[54] TELEPHONE INTERFACED SUBSCRIPTION CABLE TELEVISION SYSTEM ESPECIALLY USEFUL IN HOTELS AND MOTELS

[75] Inventors: Donald L. Theurer; Paul M. Dormans, both of Fort Wayne, Ind.

[73] Assignee: The Magnavox Company, Fort Wayne, Ind.

[22] Filed: Feb. 28, 1975

[21] Appl. No.: 554,347

[52] U.S. Cl. .................................. 358/84; 325/308; 178/DIG. 13; 358/86; 358/117
[51] Int. Cl.² ...................... H04N 7/16; H04N 7/18
[58] Field of Search ........................... 325/308, 309; 178/DIG. 13, 5.1, 6

[56] References Cited
UNITED STATES PATENTS

| | | | |
|---|---|---|---|
| 2,545,770 | 3/1951 | Ellett | 178/5.1 |
| 3,757,225 | 9/1973 | Ulicki | 325/308 |
| 3,911,204 | 10/1975 | Spimelli | 178/DIG. 13 |

Primary Examiner—Richard Murray
Assistant Examiner—Edward L. Coles
Attorney, Agent, or Firm—Thomas A. Briody; William J. Streeter; George R. Pettit

[57] ABSTRACT

A PABX telephone interfaced cable television system especially useful in hotels and motels for distributing free and premium program channels via a coaxial cable television signal distribution network to one or more subscriber terminals and associated television sets, includes a remotely tuned R.F. signal converter connected to each subscriber's television set and the coaxial cable network for enabling the set to receive a subscriber selected one of the premium channels not normally receivable by the set. The converter is automatically tuned to the selected premium channel by enabling signals transmitted from a central station to the subscriber's converter via the PABX telephone network and the subscriber's telephone. The request for a premium channel is made from the subscriber's telephone by the dialing of a predetermined sequence of digits peculiar to the requesting subscriber and the desired premium channel selected for viewing. The central station includes a control and monitoring means for receiving, verifying, and processing the subscribers dialed telephone request and for providing the enabling signals for tuning the subscriber's converter to the requested premium channel. The control and monitoring means also includes output signals to a paper tape printer for providing a record of the premium channel use activity of each subscriber terminal in the system.

6 Claims, 8 Drawing Figures

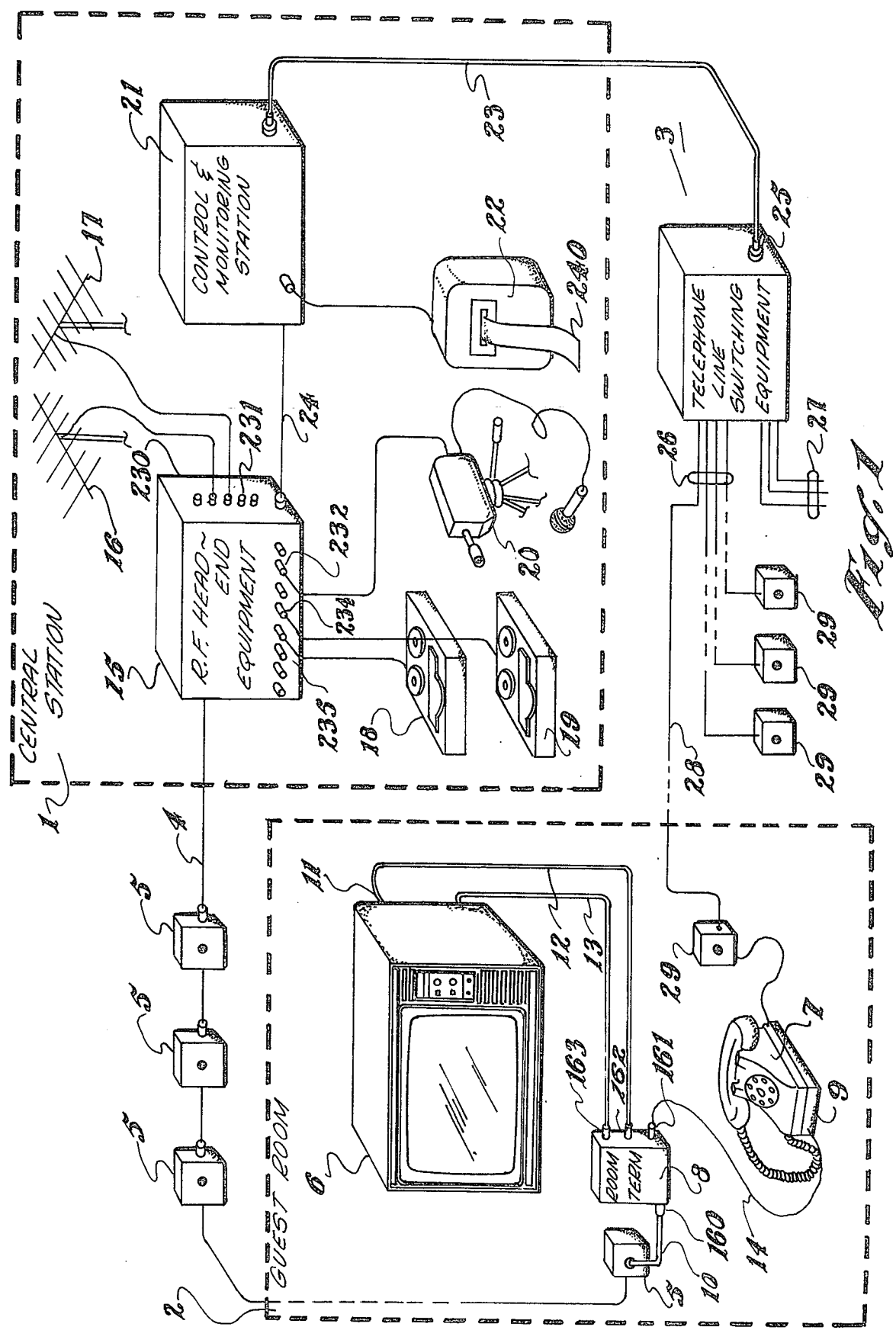

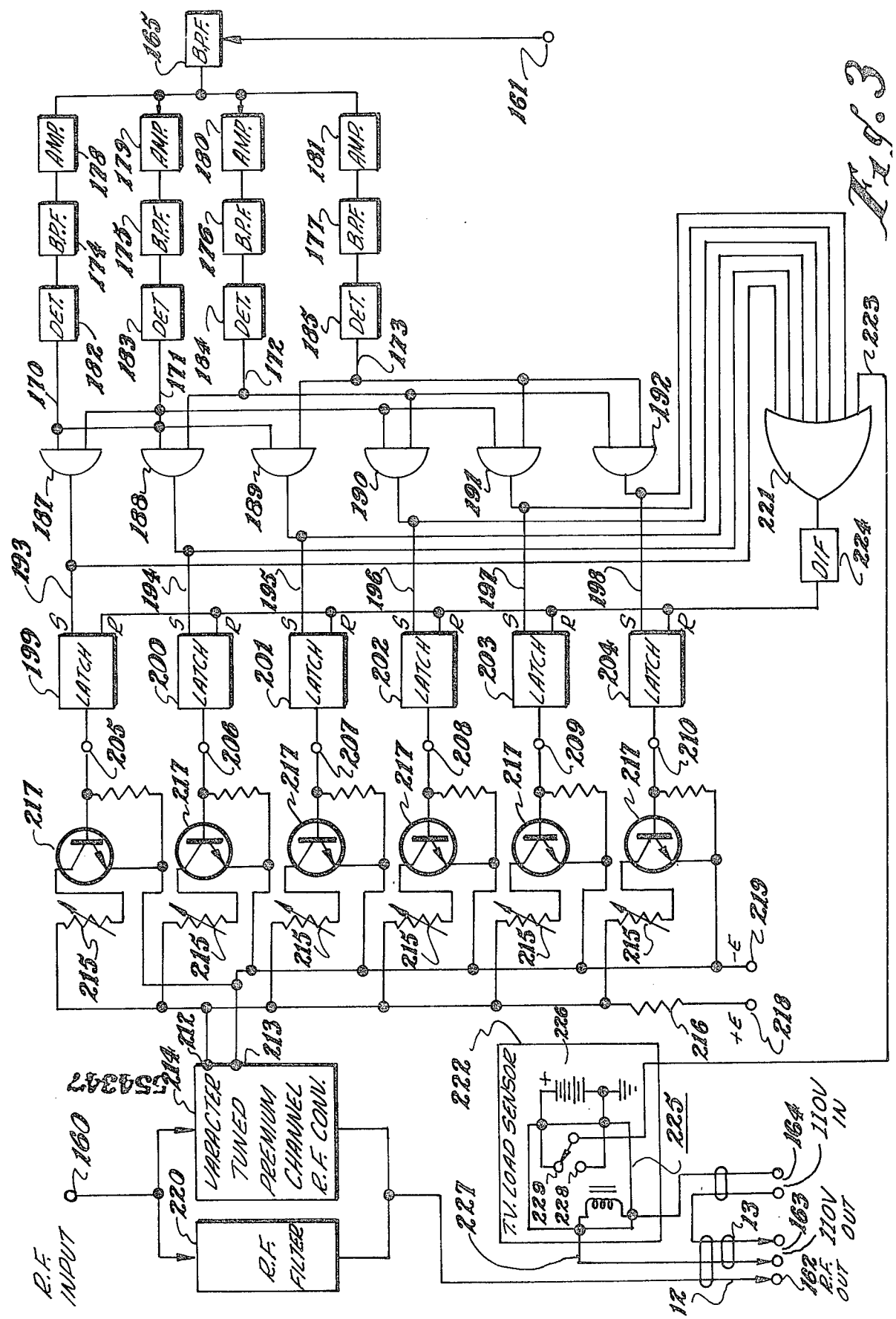

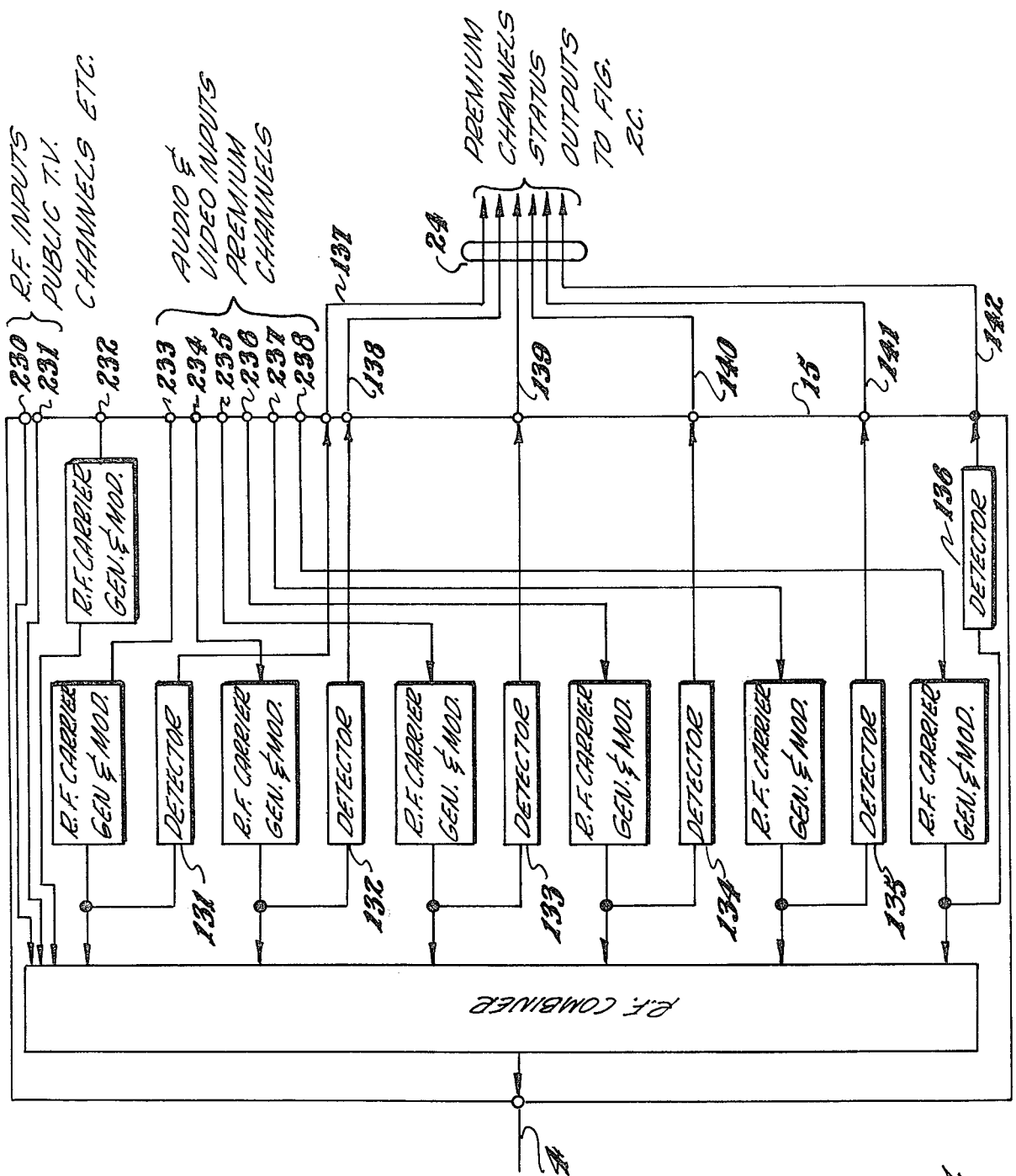

435 1 3
ROOM NO. — VERIFICATION NO. — PROGRAM NO.

TELEPHONE INTERFACED SUBSCRIPTION CABLE TELEVISION SYSTEM ESPECIALLY USEFUL IN HOTELS AND MOTELS

BACKGROUND OF THE INVENTION

1. Field of the Invention

The present invention relates to telephone interfaced subscription cable television systems and more particularly to those systems which distribute both free and premium program channels where premium program requests by the subscriber are made by telephone. Such systems can, for example, be used in hotels or apartment complexes where, in addition to the distribution of free broadcast program channels, there are also distributed premium or special program channels for which the subscriber is usually charged an additional fee for viewing.

2. Description of the Prior Art

Telephone interfaced cable television systems which utilize the subscriber's telephone equipment for program requests have been used in the past but they have not been entirely satisfactory or simple in operation. Prior art systems generally require the use of a computer or human operator for controlling and/or processing incoming subscriber telephoned requests. In addition, prior systems which utilize signal converters or program channel selectors at the subscriber terminal or location require manual subscriber operation of the converter or selector. Prior art systems also require a computer or other equipment at the central station or head end for addressing each such subscriber located device or terminal.

Because of the complexity of these prior art systems, the captial investment cost for their initial installation, as well as the cost of their operation and maintenance, are high and limit their use to installations having a relatively large number of paying subscribers. The use of such prior art systems in even large hotels are therefore not generally profitable.

SUMMARY OF THE INVENTION

In view of the foregoing, it is an object of the present invention to provide an improved telephone interfaced subscription cable television system which requires a minimum of equipment and is simple in use and automatic in operation.

It is another object of the present invention to provide a subscription cable television system which is well adapted economically for use in hotels, motels, and apartment complexes where the number of subscribers is limited compared to large public cable systems.

It is yet another object of the present invention to provide a telephone interfaced subscription cable television system having a subscriber terminal which does not require subscriber adjustment to receive a desired and selected one of a plurality of premium program channels.

It is a further object of the present invention to provide a subscription cable television system in which the subscriber terminal equipment is automatically adjusted to receive a subscriber selected program channel by signals transmitted from the central station to the subscriber terminal via the subscriber's telephone and associated telephone network.

It is yet a further object of the present invention to provide a telephone interfaced cable television system in which the subscriber terminals do not require addressing by the central station.

It is still another object of the present invention to provide a subscription cable television system which utilizes the local telephone network for the transmission of subscriber program request signals to the central station and for the transmission of subscriber terminal enabling signals from the central station to the subscriber terminals.

In addition, existing cable television systems utilizing a central station which transmits television signals in non-standard frequency bands may be easily converted to the telephone interfaced subscriber television system described herein.

In accordance with the present invention, in one form, there is provided a conventional coaxial cable television signal distribution network interconnecting a central station and a plurality of subscriber terminals and associated television sets. Certain of the television signals trasmitted from the central station have frequencies corresponding to the standard F.C.C. authorized television channels which, for example, can be in the standard V.H.F. television band, channels 2 through 6 and 7 through 13. These signals may be received and viewed on the subscriber's standard television set as transmitted from the central station without the necessity of any additional frequency conversion or decoding and for purposes of illustration in this specification are considered as "free" program channels. Certain other of the television signals transmitted from the central station have non-standard channel frequencies and can, for example, be appropriately located midband in the V.H.F. band between the standard channels 6 and 7. Again, for illustrative purposes, these non-standard channels are considered in the specification as "premium" or "restricted" program channels. For viewing of these premium program channels on the subscriber's television set, they are converted in frequency to a standard channel frequency capable of being received by the television set, such as channel 12, for example. Thus, these non-standard television signals are modified or converted to standard television signals. It will be understood by those skilled in the art that scrambling of the premium program television signals can be utilized without departing from the spirit of the present invention.

Conversion of the premium channels is provided by a subscriber room terminal which interfaces the subscriber's television set with the coaxial cable signal distribution network. Conversion of any selected one of the premium channels as may be desired by the subscriber is made automatically upon a telephone dialed request by the subscriber to the central station. Subscriber request for such premium program viewing is made by use of the subscriber's telephone. A typical request in a hotel installed system according to the present invention would comprise first, the dialing by the subscriber or room guest, of a predetermined access digit followed by the digits of the guest's room number and a special verification number or digit known only to the quest of that room and last, the dialing of a program number or digit corresponding to the particular premium program or channel for which viewing is desired.

The central station includes conventional cable television R.F. head end equipment for transmitting the television signals, including the aforementioned premium program channels, via the coaxial cable distribution network to each subscriber in the system. The central station also includes at least one premium channel control and monitoring means which accepts and processes the subscriber telephoned requests. The control and monitoring means is interfaced with the telephone network which, in the exemplified hotel installation, would comprise the hotel's PABX system. Dialing of the access digit, which is known to all subscribers, by a particular subscriber or room guest provides connection of that subscriber's telephone with the control and monitoring means and allows acceptance and processing of the remainder of the subscriber dialed request digits by the control and monitoring means.

During the time period when the control and monitoring means is processing a given subscriber's request, a busy signal is provided by the PABX system to all other subscribers which at that time dial the access digit. This, of course, indicates that the access digit should be redialed. The central station can include a plurality of control and monitoring means to provide the processing of requests from a plurality of subscribers simultaneously. If a control and monitoring means is available at the time of the dialing of the access digit by a given subscriber, the available control and monitoring means will provide a ready tone or signal to the given subscriber via his telephone, indicating that the control and monitoring device is available for use by the requesting subscriber and that the remainder of the request digits may be dialed by the requesting subscriber.

The control and monitoring means upon receiving a satisfactorily dialed subscriber request which includes the proper room and verification digits, will respond by providing enabling signals to the requesting subscriber telephone and room terminal via the telephone network. These enabling signals in the one embodiment described herein comprise a pair of audio tones which are inductively coupled from the subscriber telephone to the subscriber room terminal. The enabling signals have frequencies that are peculiar to the particular requested premium channel. A unique pair or combination of tones is provided for each premium program channel available for subscriber viewing.

The subscriber room terminal responds to the enabling signals by providing a D.C. tuning voltage to a voltage or varactor tuned premium channel converter within the subscriber room terminal. A different D.C. voltage level is provided for each pair of enabling tones representing each of the available premium program channels. The tuning voltage level is therefore a function of the requested premium channel. The requested premium channel is thus converted in frequency to one which is receivable by the subscriber television set, such as channel 12 as stated in the aforementioned example. For subscriber viewing of a premium channel, it is only necessary that the subscriber television set be adjusted to a single predetermined and known channel either prior to or after the dialed request has been made; no other adjustment is required by the subscriber. The television set can be a standard television receiver such as is sold commercially for home use for receiving standard F.C.C. authorized television signal channels.

The control and monitoring means, in addition to providing the enabling signals to the subscriber room terminals, also provides signals to a tape printer at the central station for maintaining a log or record of the premium channel usage by each subscriber in the system. As an example, in a hotel installation of the system there can be provided a printed record of each premium program request including the guest room, verification, and requested premium program channel numbers, as well as the date and time of such request if desired.

The above objects of the present invention, as well as other objectives, features, and advantages, will become more apparent from the following description with reference to the accompanying drawings.

BRIEF DESCRIPTION OF THE DRAWINGS

FIG. 1 is a pictorial view of the complete television program request and signal distribution system illustrating the present invention in one form;

FIG. 3 is a block diagram of a subscriber room terminal which can be used in the system of FIG. 1;

FIG. 4 is a simplified block diagram of a head end equipment which can be used in the system of FIG. 1;

DESCRIPTION OF THE PREFERRED EMBODIMENT

Figure 2A:
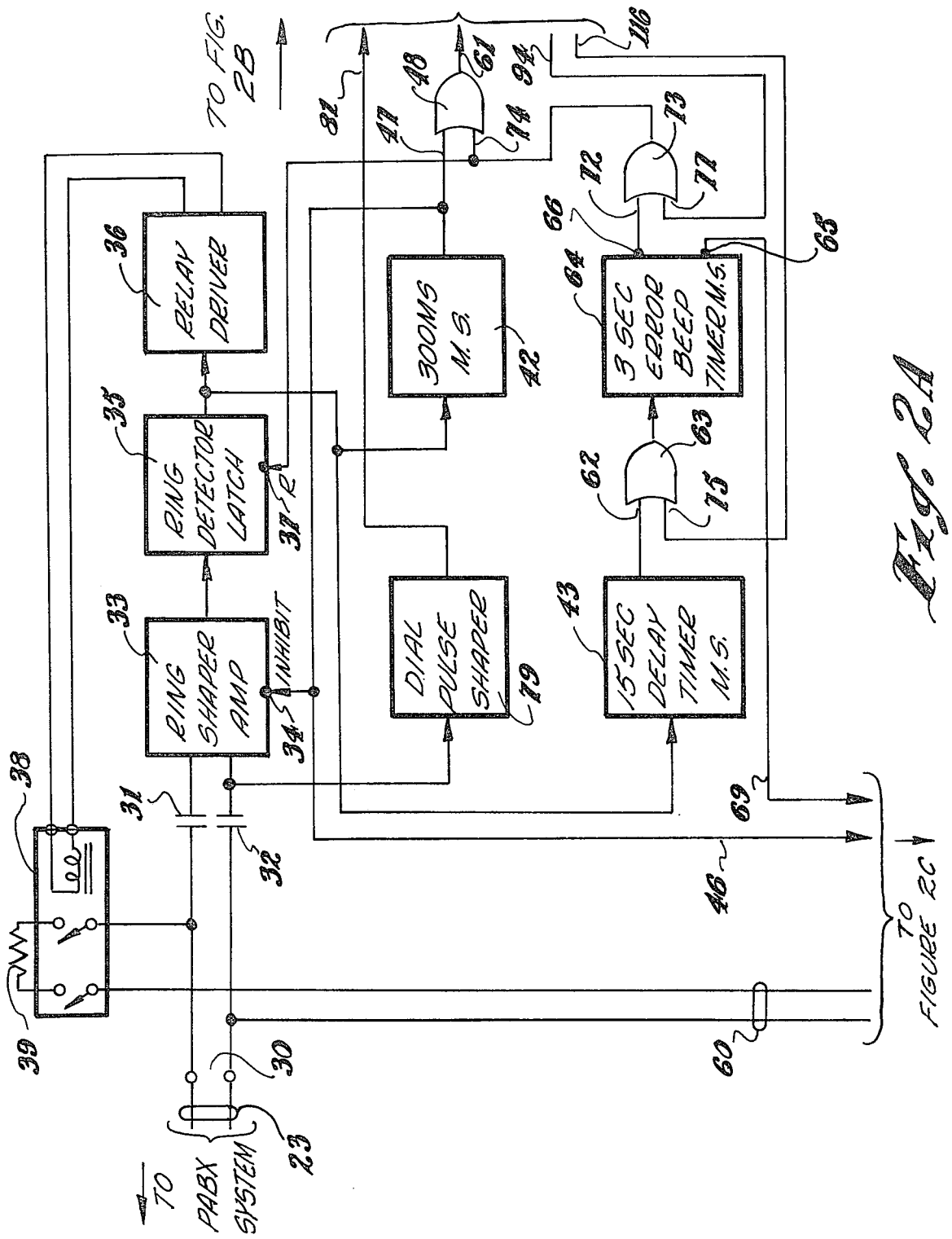
FIGS. 2A through 2C combined is a block diagram of a control and monitoring station which can be used in the system of FIG. 1.

For a better understanding of the present invention in one form thereof, reference is made to the accompanying drawings. FIG. 1 is a pictorial view of the complete television program request and distribution system including a central station 1, one of a plurality of guest rooms 2, and a PABX or private automatic telephone exchange equipment 3. Block diagrams of the various component parts of the system shown in FIG. 1 are illustrated in greater detail in FIGS. 2 through 4 and their operation in the system will be disclosed herein later.

It should be understood that although the operation of the following disclosed embodiment of the present invention is described in relation to its use in a hotel or motel like environment, the invention is not so limited. The system can for example, be used in apartment and multi-unit condominium complexes as well as public cable television networks. In addition, the use of the word "subscriber" in this disclosure is intended to encompass house or hotel and motel room guests as well as apartment and condominium tenants or owners and the like.

In the circuit descriptions which follow, reference to high and low level signals denote respective types of 1, true, or presence and 0, false, or absence logic signal states which are well known to those skilled in the art. It should be understood, however, that the invention is not limited in operation to the use of the logic signal states described and shown, since those skilled in the art can readily adapt the various circuits described to operate with the use of positive true and/or negative true type logic.

The pulse duration and delay time periods illustrated in the herein described embodiment of the present invention are typically based upon utilization of telephone signals provided by telephone equipment complying with well known telephone D.C. dial pulse and pulse train standards. As an example, standard telephone dial pulses occur at a rate of 8 to 10 pulses per second with each one of the pulses having a width of between 36 and 42% of a single pulse cycle. In addition, the minimum interdigital time is 600 milliseconds. It will be understood by those skilled in the art that dial pulses having other than the standard characteristics can be used with corresponding changes in the illustrated duration and delay times. In addition, the disclosed system can be utilized with "touch-pad" type telephones by replacing the dial pulse processing circuitry with appropriate tone addressing circuitry.

Referring now again to FIG. 1, there is shown a central station 1 which supplies and transmits free and premium program television signals to one or more subscriber locations or guest rooms 2 by means of the coaxial cable distribution network 4. The coaxial cable line taps 5 are conventional and provide a means of supplying the television signals from the coaxial cable network 4 to each of a plurality of guest rooms 2 and associated equipment located within. In addition to a standard or conventional television set 6 and telephone 7 which are normally provided in each guest room 2, there is also provided in accordance with the present invention, a subscriber room terminal 8, and a telephone signal pickup means 9. The television signals from the coaxial cable line tap 5 are supplied to the subscriber room terminal 8 via the interconnecting signal cable 10 whereupon they are either converted or unconverted in frequency and supplied to the antenna input terminals 11 of the television set 6 via the antenna signal cable 12. The A.C. line power cord 13 from the television set 6 interconnects to the hotel A.C. power line (not shown) within the subscriber room terminal 8. Telephone signals from the telephone pickup means 9 are supplied to the subscriber room terminal 8 by means of the interconnecting signal cable 14. The pickup means 9 shown in FIG. 1 is intended to represent an inductive type of pickup; however, other equally well known types may be used or the subscriber room terminal can be "hard wired" directly into the PABX telephone system 3 in accordance with accepted and standard telephone practices.

The central station 1 is comprised of a R.F. head end equipment 15 which operates to provide radio frequency television signals to the coaxial cable signal distribution network 4. The channel frequencies of the R.F. television signals provided by the head end 15 are in two groups, the first being in a frequency range normally receivable by the guest room television set 6, and the second being in a frequency range not receivable by the television set 6 without first being converted in frequency. Television program material for distribution to guest room subscribers can be supplied from public off-the-air television signals by means of antennas 16, 17 as well as from the video tape equipment 18, 19 and/or television camera equipment 20. The central station 1 of FIG. 1 also comprises a control and monitoring station 21 and associated paper tape printer 22. It should be understood, however, that the control and monitoring station 21 and/or printer 22 can be physically located elsewhere if convenience and desirability so dictate. The control and monitoring station 21 is interconnected with the PABX telephone system 3 via an interconnecting telephone line 23. The control and monitoring station 21 can also be connected to the head end equipment 15 via signal cable 24, the purpose of which will herein later be described.

The PABX telephone system 3 is conventional and typically comprises line switching equipment 25, in-house telephone lines 26 outside telephone lines 27 which normally connect to a central telephone exchange (not shown) outside the PABX system 3, one or more in-house or guest room subscriber telephone sets 7 and its respective individual telephone line 28 and terminal block 29. The PABX telephone system 3 operates to provide connection of the control and monitoring station 21 with a given one of the subscriber telephone sets 7 upon a dialed access request from that telephone set. Although a PABX telephone system or the like is utilized in the television system of the present invention, such PABX equipments are well known in the art and therefore a detailed explanation of its operation is not given. The only requirement of the PABX system 3 is that it be capable of providing the connecting of a given subscriber telephone set 7 to the control and monitoring station 21 upon the subscriber dialing of a predetermined access number and, after the resulting connection of the subscriber telephone set 7 with the control and monitoring station 21 has been made, that the PABX system provide for any additional dialing pulses originating from the given subscriber's telephone set 7 to be transmitted to the control and monitoring station 21 for further processing. It should be understood that the PABX system 3 can have the capability of supplying more than one interconnecting telephone line 23 to more than one corresponding control and monitoring station 21 in order that access calls can be accepted simultaneously from more than one subscriber telephone sets 7. This will provide for the simultaneous processing of subscriber program requests from a plurality of subscribers by a plurality of control and monitoring stations 21.

After the dialing of the predetermined access number by the subscriber, and the resulting connection of the subscriber's telephone set 7 with the control and monitoring station 21, any additional program request dialing pulses from the subscriber's telephone set 7 will be processed by the control and monitoring station 21. The control and monitoring station 21 will in turn send back to the subscriber telephone set 7 via the PABX system 3, enabling signals for activation of the subscribers room terminal 8 as will herein later be described. The predetermined access number which is dialed by the subscriber or room guest to gain access to the control and monitoring station 21 is normally dictated by the PABX system 3 or more specifically by the line switching equipment 25. This access number may be any convenient digit such as for example, the number 6 could be used in the embodiment of the present invention which is described herein.

The above described operation of the PABX system 3 upon the dialing of the access number is much the same as that which normally occurs when one, for example, dials a number 9 to gain access to an outside line 27 which connects the dialed telephone set to a central telephone exchange outside of the PABX system whereupon the central exchange processes any additional dial pulses from the connected telephone set. It should be understood, however, that the outside lines 27 or the central telephone exchange located external from the PABX system 3 is not required for the operation of the present invention.

Figure 2B:
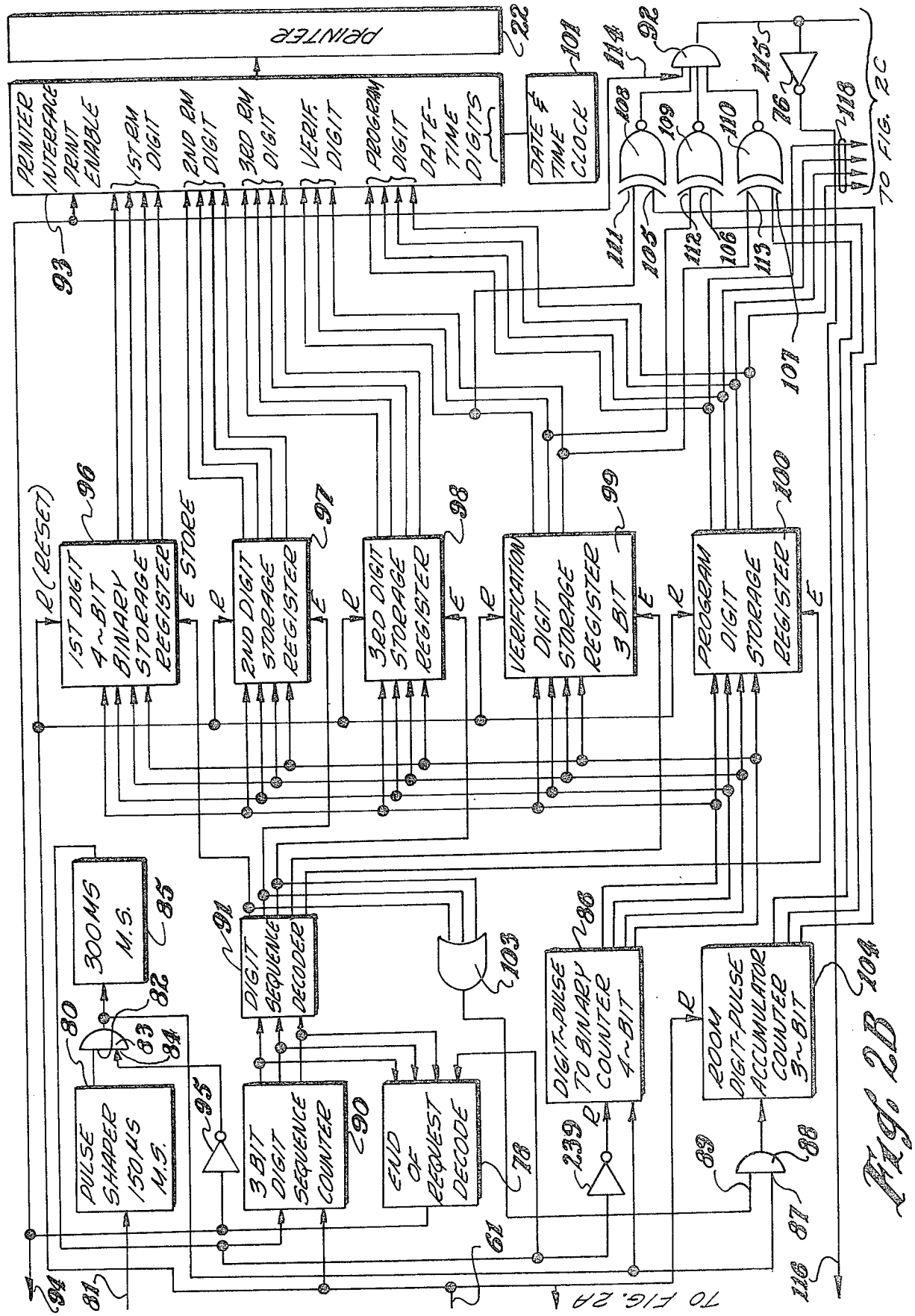
Figure 2C:
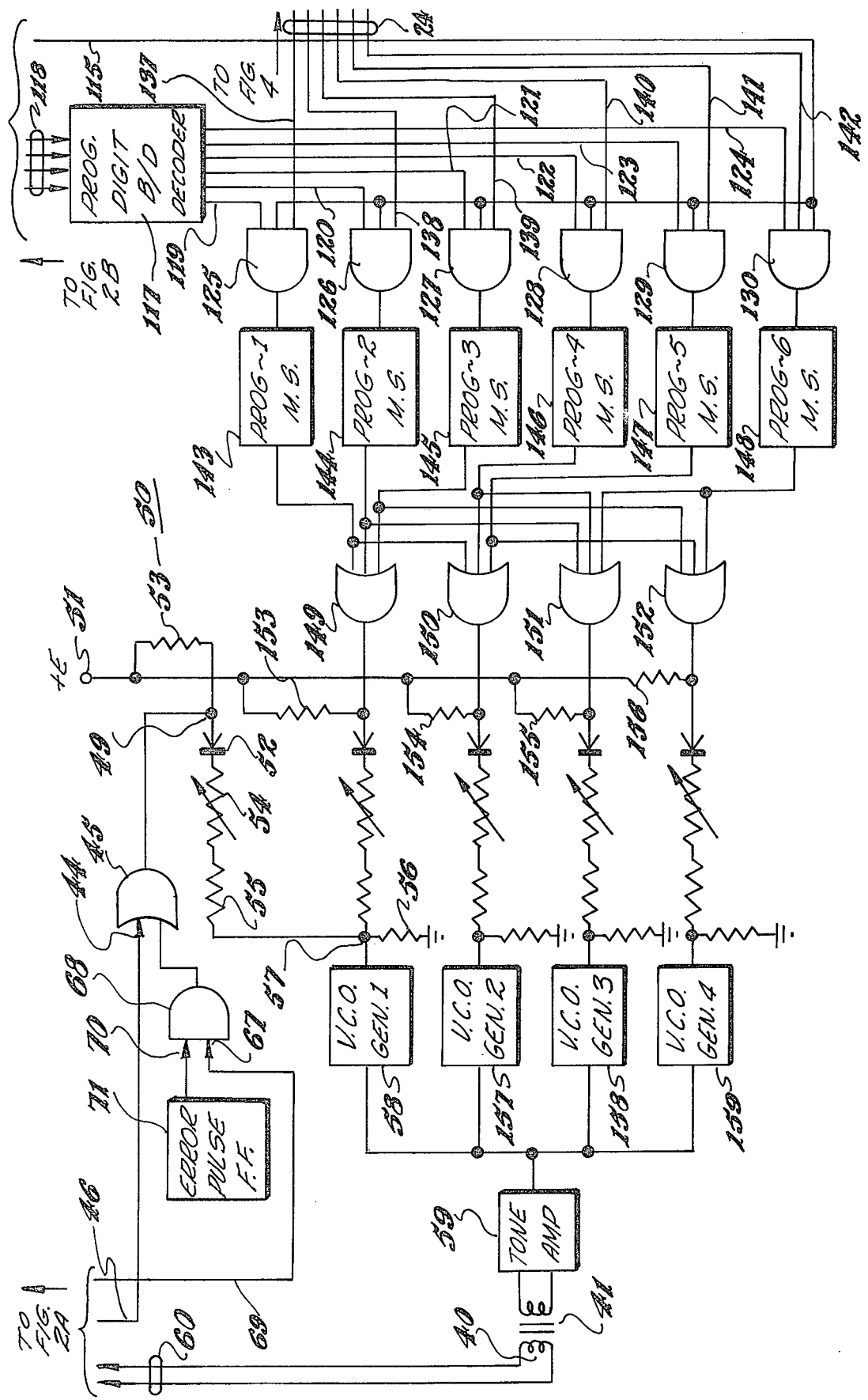

Referring now in more detail to the combined FIGS. 2A through 2C, there is shown a block diagram of the control and monitoring station 21. Referring more specifically to FIG. 2A, the dialing of the access number at a given subscriber telephone set 7 will provide connection of that telephone set 7 with the control and monitoring station 21, as previously described. A low frequency telephone ringing signal provided by the PABX system 3 will appear at the telephone line terminals 30 via the interconnecting telephone line 23. This ringing signal is in turn applied through the coupling capacitors 31 and 32 to the input of a ringing signal shaper amplifier 33 where it is shaped and amplified. Amplifier 33 is normally enabled to pass the ringing signal at its input to its output but can be disabled or inhibited by application of an inhibiting signal at an inhibit terminal 34. The signal appearing at the output of the shaper amplifier 33 representing the ringing signal is provided as an input signal to a ringing signal detector 35. The detector 35 detects the presence of the ringing signal at its input and in turn provides an output signal to a relay driver 36. The detector 35 is capable of being latched to an ON state by the presence of the ringing signal at its input and remains in the ON state until it is reset by the application of a reset signal at its reset terminal 37. The detector 35 provides an output signal to the relay driver 36 during that time that the detector 35 is latched in the ON state. The relay driver 36, in turn, provides activation of a relay 38, thereby causing the contacts of the relay 38 to close from a normally open condition whenever the relay driver 36 is supplied with an output signal from the detector 35. The relay driver 36 can be a D.C. amplifier with the electro-magnetic coil of the relay 38 in its output circuit. Thus, when the PABX ringing signal is applied to the telephone line terminals 30, the contacts of relay 38 are caused to close. The closing of these contacts places the series combination of resistor 39 and the secondary winding 40 (FIG. 2C) of a tone amplifier output transformer 41, across the telephone line input terminals 30 and associated telephone line 23. This resultant electrical loading of the telephone line 23 is presented to the telephone switching equipment 25 and indicates to the PABX equipment that there is a "off-hook" condition or, in other words, that the control and monitoring station 21 has accepted the incoming call represented by the ringing signal.

The output signal from the ringing signal detector 35, in addition to being applied to the input of the relay driver 36, is also applied to an input of a 300 millisecond mono-stable multivibrator 42 and a 15 second delay timer 43. The 300 millisecond mono-stable multivibrator 42 operates to provide an output signal which changes to a high level state during a 300 millisecond time period duration after receiving its input signal from the ringing signal detector 35. The 300 millisecond output signal from the mono-stable multivibrator 42 is applied to the inhibit terminal 34 of the ringing signal shaper amplifier 33 thereby preventing the ringing signal shaper amplifier 33 from providing any additional ringing signals to the input of the ringing signal detector 35 during the 300 millisecond time period. The 300 millisecond output signal from the mono-stable multivibrator 42 is also applied to a signal input terminal 44 of an OR gate 45 (FIG. 2C) via the interconnecting lead 46 and to a signal input terminal 47 of an OR gate 48.

Now referring to FIG. 2C, operation of the OR gate 45 in response to the 300 millisecond signal at its input terminal 44, provides the unclamping of junction point 49, of a voltage control oscillator control circuit 50, from a normally low or ground level to a level substantially equal to the positive voltage level present at the supply voltage terminal 51. The V.C.O. control circuit 50 is comprised of a series combination of diode 52 and resistors, 53, 54, 55, and 56, connected between ground level and the supply voltage terminal 51. The unclamping of junction point 49 causes the diode 52 to conduct, thereby providing a D.C. voltage to be applied to a frequency control terminal 57 of a voltage controlled audio tone oscillator or generator 58. The level of the voltage at the control terminal 57, and thus the output signal frequency of the V.C.O. 58, is set to a predetermined value by means of the adjustable resistor 54. The output signal from the generator 58 is amplified by a tone amplifier 59 and passed by its output transformer 41 and interconnecting leads 60 to the telephone line terminals 30 whereupon it is supplied as a ready-tone to the requesting subscriber's room telephone set 7 via the telephone line 23 and PABX system 3. This ready-tone indicates to the requesting subscriber that the control and monitoring station 21 has responded to the incoming access request or ringing signal and is ready to process a program request from the requesting room telephone set 7. In the particular embodiment of the present invention described herein, the dialed request must be made by the subscriber within a 15 second time period following the ready-tone as will be later apparent. The output signal frequency of generator 58 during the time period when the junction point 49 is clamped to ground level, is far outside the passband of the tone amplifier 59 and/or output transformer 41 and thus the unclamping of junction point 49 by the OR gate 45 for all practical purposes enables generator 58.

Now again referring to FIG. 2A, the OR gate 48 provides a reset output signal on interconnecting lead 61 in response to the 300 millisecond signal at its input terminal 47. This output signal is supplied to the reset terminals (R) of the digit pulse accumulator 104, digit sequence counter 90 and storage registers 96–100 shown in FIG. 2B via the interconnecting lead 61 and provides for the resetting of these pulse circuits to their initial states.

The 15 second delay timer mono-stable MV 43 operates to provide an output signal 15 seconds after it receives the output signal from the ringing detector latch 35. The output signal from the 15 second delay timer 43 is supplied to a first signal input terminal 62 of an OR gate 63 and in response to this signal, the OR gate 63 provides an input signal to a 3 second error beep timer mono-stable MV 64. The 3 second timer 64, upon receiving the input signal from the OR gate 63, operates to provide at a first output terminal 65, a first output signal having a 3 second time duration and at a second output terminal 66 a second output signal which is delayed for a 3 second time period after receiving the input signal from the OR gate 63.

The first output signal from the 3 second timer 64 and appearing at the output terminal 65 is supplied to a first input 67 of an AND gate 68 (FIG. 2C) via interconnecting line 69. A second input 70 of AND gate 68 is provided by an error pulse multivibrator 71 which generates repetitive pulses at a low frequency rate of, for example, 10 Hz per second. Thus 15 seconds after the detector 35 has detected the ringing signal, AND gate 68 will provide to OR gate 45 a low frequency 10 Hz per second pulsed signal of 3 seconds time duration. This pulsed signal is supplied by OR gate 45 to the junction point 49 of the V.C.O. control circuit 50, thereby enabling generator 58, as previously described, at the 10 Hz per second rate for a time duration of 3 seconds. The output of generator 58 is supplied as an error beep signal to the subscribers room telephone 7 as previously described and indicates to the requesting subscriber as will later be apparent, that an error in the subscriber request was made or that the subscriber request was not received by the control and monitoring station 21 within the required 15 second interval of time.

The second output signal from the 3 second timer 64 and appearing at the output terminal 66 is supplied to a first input terminal 72 of an OR gate 73. The OR gate 73 in turn operates to provide an input signal to a second input terminal 74 of the OR gate 48 whereupon the operation of the OR gate 48 provides an output signal on the interconnecting lead 61 for resetting the pulse circuits shown in FIG. 2B as previously described. Thus, any pulse circuits which may have been activated are again reset 18 seconds after the ring detector 35 detects the PABX ringing signal and supplies an output signal to the input of the 15 second delay timer 43.

The output signal from OR gate 73 which is supplied to the second input terminal 74 of the OR gate 48 is also supplied to the reset terminal 37 of the ring detector 35 whereby the ring detector 35 is also unlatched or reset. The resetting of the ring detector 35, in turn, deactivates the relay 38 which signals the PABX system 3 that the call is terminated and that an "on-hook" condition exists.

Briefly summarizing the above described operation, the control and monitoring 21 provides an off-hook condition to the PABX system 3 upon detecting the ringing signal from the PABX system 3. A ready tone signal is at this time provided and supplied to the PABX system 3 by the control and monitoring station 21. A reset signal is also provided to the pulse circuits of the control and monitoring station 21 for resetting the pulse circuits to their initial states. At this point in operation the subscriber would normally proceed with his dialing request, however, if the subscriber fails to proceed with the dialing of his room, verification, and program request numbers or fails to complete this request within a 15 second time period immediately following the detection of the ringing signal and the initiation of the ready tone, the control and monitoring station 21 will provide to the PABX system 3 an error beep signal of 3 seconds time duration commencing 15 seconds after the control and monitoring station 21 detects the ringing signal. Immediately following the 3 seconds time duration of the error beep signal and 18 seconds after the ringing signal has been detected, the ring detector latch will be reset and a pulse reset signal will be provided to the pulse circuits of the control and monitoring station 21 for resetting any of the pulse circuits which may have been activated during the 15 second time period.

It will be apparent that the pulse circuits of the control and monitoring station 21 can be reset prior to the above described 18 second time period by a signal at a second input terminal 75 of the OR gate 63 in which case the 3 second error beep signal will be provided as previously described to provide the operation of the OR gates 73 and 48 and the resulting presence of a reset signal on the interconnecting line 61. It will later be apparent that a signal at the second input terminal 75 of the OR gate 63 will be provided by an inverter amplifier 76 (FIG. 2B) whenever the subscriber dialed room and/or verification numbers are not proper.

It will also be apparent that the pulse circuits of the control and monitoring station 21 can be reset prior to the described 18 second period of time, by a signal on a second input terminal 77 of OR gate 73. In this case, however, the signal at the second input terminal 77 will not result in providing the 3 second error beep signal prior to the pulse reset signal on the interconnecting line 61. It will later be apparent that a signal at the second input terminal 77 of the OR gate 73 can be provided by the end of request decoder 78 (FIG. 2B) upon the completion of the processing by the control and monitoring station 21 of a proper subscriber room, verification and program request.

After the subscriber has dialed the access number and has received the ready tone, he proceeds with the dialing of his room, verification, and program request numbers. The resulting dial pulses from the requesting subscriber's telephone set 7 are supplied to the telephone line terminals 30 of the control and monitoring station 21 by the PABX system 3, as previously described. The telephone dial pulses present at the telephone line terminals 30 are supplied to a dial pulse shaper 79 for clipping the incoming dial pulses and for eliminating extraneous noises which may be present on the telephone line.

Now referring to FIG. 2B, the output of the pulse shaper 79 (FIG. 2A) is applied to the input of a second pulse shaper 80 via the interconnecting lead 81. The pulse shaper 80 comprises a mono-stable multivibrator which provides for each input dial pulse, an output signal pulse of 150 microseconds duration. Thus, the output of the pulse shaper 80 will comprise a number of pulse trains, each train representing a different digit or number dialed by the subscriber and each train comprising one or more pulses. Therefore, for the herein stated example of a three digit room number (435), a single digit verification number (1), and a single digit program number (3), the output of the pulse shaper 80 would comprise a series of five pulse trains with the number of pulses in each respective train being 4, 3, 5, 1, and 3. The output of the pulse shaper 80 is applied to a first input 82 of an AND gate 83. The AND gate 83 provides an output signal for each 150 microsecond input pulse appearing at its first input terminal 82, since the second input terminal 84 is normally at a high level as will herein later be apparent. The output signal of AND gate 83 representing each incoming dial pulse to the control and monitoring station 21 is applied to the input of a 300 millisecond mono-stable multivibrator 85, as well as to the input of a digit pulse to binary counter 86 and a first input terminal 87 of an AND gate 88. The second input 89 of the AND gate 88 will be described later.

The 300 millisecond mono-stable MV 85 provides an output signal pulse of 300 milliseconds duration for each input pulse; however, since more than one 150 microsecond input pulse from the AND gate 83 can occur within a single 300 millisecond period, the output of the 300 millisecond multivibrator 85 will, for all practical purposes, comprise a single continuous high level pulse starting with the first 150 microsecond input pulse and ending approximately 300 milliseconds after the last 150 microsecond input pulse of each pulse train received, representing each digit dialed by the subscriber. Thus, for the herein stated example of a three digit room number (435), a single digit verification number (1), and a single digit program number (3), the output of the 300 millisecond mono-stable MV 85 would comprise a series of five separate pulses, each pulse having respective approximate pulse widths of 700, 600, 800, 400, and 600 milliseconds.

The above described signal output of the 300 millisecond MV 85 is applied to an input of the end of request decoder 78 and to an input of a 3 bit digit pulse sequence counter 90, and inverter amplifier 239. The digit pulse sequence counter 90 is a conventional 3 stage binary flip-flop circuit which converts the series of incoming pulses representing each of the subscriber dialed digits into binary count output signals. It counts the number of incoming digit pulses from the 300 millisecond mono-stable MV 85 and provides a 3 bit binary output signal for each incoming digit pulse. Thus, for example, a binary one is provided at the output for the first incoming digit pulse, and a binary two for the second incoming digit pulse and so on, up to and including a binary five for the fifth incoming digit pulse from the 300 millisecond mono-stable MV 85. This last or fifth digit represents the specific premium program requested by the subscriber in the embodiment disclosed. Each bit of the 3 bit binary output signal from the digit sequence counter 90 is applied in parallel to an input of a digit sequence decoder 91 and to the end of request decoder 78.

The end of request decoder 78 operates to provide an output signal which changes from a normally low level state to a high level state at the end of the last digit dialed by the subscriber. Thus, in the herein stated example, the output signal of the end of request decoder 78 would go high at the completion of the fifth digit dialed by the subscriber, i.e. the program digit 3. In other words, when a binary 5 is provided by the digit sequence counter 90 and a low level signal is provided by the 300 millisecond mono-stable Mv 85, the end of request decoder 78 will provide at its output a high level signal. When the digit sequence decoder 90 is in a reset condition, the output of the end of request decoder 78 is in a low level state.

The output signal of the end of request decoder 78 in addition to being supplied to the AND gate 92, printer interface 93, and an interconnecting line 94 is also supplied to the input of an inverter amplifier 95. The output of the inverter amplifier 95 is in turn supplied to input terminal 84 of AND gate 83. Thus at the completion of the subscriber's dialed request, the AND gate 83 prevents any additional signals to be supplied to the 300 millisecond mono-stable MV 85 since at this time the output of the inverter amplifier 95 is in a low level state. It should be noted that as soon as the digit sequence counter 90 is reset by a reset signal on the interconnecting line 61, the input terminal 84 of the AND gate 83 will be at a high level thus permitting the AND gate 83 to provide output signals to the 300 millisecond mono-stable MV 85 as would be necessary to process new requests either from the same subscriber or new subscribers. The output of the end of request decoder 78 is supplied to the input terminal 77 of the OR gate 73 (FIG. 2A). Thus at the completion of the subscriber's dialed request, the OR gate 73 will initiate the pulse circuits and ring detector 35 to be reset as previously explained.

The digit sequence decoder 91 operates on the binary output signals from the digit sequence counter 90 to provide corresponding output signals on successive ones of five output lines with the signal on each different output line representing the respective first, second, third, fourth, and fifth input digit pulse counted by the digit sequence counter 90. Each different digit output signal, i.e. representing first, second, third, fourth, and fifth digits and appearing on the respective one of the five output lines of the digit sequence decoder 91 is applied to an enable or store terminal (E) of a corresponding one of five binary storage registers 96, 97, 98, 99, and 100 for the respective first, second, third, fourth (verification), and fifth (program) digits. Thus, the 300 millisecond mono-stable MV 85, digit sequence counter 90, and digit sequence decoder 91 operate to provide successive storage enabling signals to each one of the digit storage registers 96–100 at appropriate times, the purpose of which will be more apparent herein later.

The digit pulse to binary counter 86 is a 4 bit binary flip-flop circuit which converts the individual 150 microsecond pulses of each dialed digit from the AND gate 83 into a 4 bit binary output signal. The 4 bit binary output signals from the digit pulse to binary counter 86 are applied in parallel to each one of the digit storage registers 96–100. The output of the 300 millisecond monostable MV 85 is inverted by inverter amplifier 239 and is in turn applied to the reset terminal (R) of the counter 86. The output signal of the inverter amplifier 239 thus resets the counter 86 at the end of each dialed digit when the output signal of the 300 millisecond mono-stable MV 85 returns to a low level state, i.e. at the end of each 300 millisecond pulse. Although the digit counter 86 supplies a 4 bit binary signal for each of the five digits of the subscriber's dialed request to all 5 storage registers 96–100, only that digit storage register corresponding to a particular one of the five dialed digits will be enabled at the appropriate time so as to store only that 4 bit binary signal representing the respective digit number, i.e. for example, the digit storage register 96 is enabled to store only the binary number representing the first digit, storage register 97 is enabled to store only the 2nd digit binary number and so on up to storage of the fifth digit in storage register 100.

Figures 5, 6:
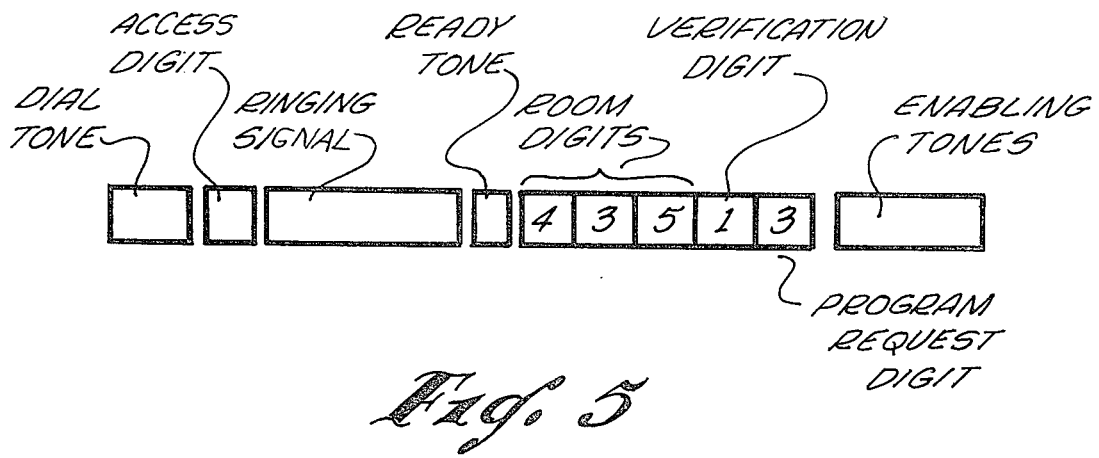
FIG. 5 illustrates a typical subscriber dialed program request of the present invention in one form and the dialing sequence of the various digits contained herein.
FIG. 6 illustrates a typical recorded printout delivered by the printer used in the system of FIG. 1.

The binary information stored in the storage registers 96–100 and representing the respective first through fifth digits dialed by the subscriber in making his premium program request are supplied to a printer interface 93. Information signals related to the date and time of the specific program request is also supplied to the printer interface 93 from a date and time clock 101. The printer interface 93 converts the binary information from the storage registers 96–100 and the date and time information signals from the date and time clock 101 into output signals suitable for supplying to and activating a tape printer 22. In one embodiment of the present invention, the printer interface 93 comprised a number of binary to decade decoders or converters for providing activation of the printer 22. If a printer 22 is utilized which provides its own date and time information for printout then, of course, the date and time clock 101 is superfluous and would not be required. The printer interface 93 also receives an enabling signal input from the end of request decoder 78 which was described previously. This enabling signal signifies that the subscriber has completed his dialed request and this signal is utilized by the printer interface 93 to signal the printer 22 that it may record the information supplied to it by the printer interface 93. FIG. 6 illustrates a typical printout of a subscriber's premium program request and is comprised of the requesting guest room number, the verification code number, and the specific premium program which was requested.

The verification code number is used to authenticate the subscriber request. In the herein disclosed hotel type environment of the present invention, the verification code number is used to make certain that the subscriber request is being made by the room guest actually assigned to the so identified guest room. This minimizes the possibility of cheating and erroneous premium program charges which would result. In the disclosed embodiment of the present invention, a verification code number is assigned to each subscriber guest room with the code number being a function of the guest room number. Thus, the control and monitoring station 21, upon processing a guest room subscriber's request, compares the room number digits with the verification code digit and if the proper correlation exists provides enabling signals for transmission to the subscriber's room terminal 8 via the PABX system 3 and telephone set signal pickup means 9.

In the disclosed embodiment, the verification code numbers used for the various guest room numbers are illustrated in the table below:

| SUM OF 3 DIGITS OF ROOM NUMBER (no digit and zero equal to 10) | VERIFICATION CODE NUMBER |
| --- | --- |
| 3, 11, 19, 27 | 6 |
| 4, 12, 20, 28 | 1 |
| 5, 13, 21, 29 | 5 |
| 6, 14, 22 | 3 |
| 7, 15, 23 | 7 |
| 8, 16, 24 | 8 |
| 9, 17, 25 | 4 |
| 10, 18, 26 | 2 |

As an example, room number 30 would be assigned the code number 7 since the sum of the three digits, i.e. 0-3-, would equal 23. Likewise, the room numbers 115, 104, and 300 would also use the code number 7 since their three digit sums are 7, 15, and 23 respectively. The code numbers above are derived by (1) summing the 3 digits of the room number using 10 where no digit exists or where a zero digit exists; (2) expressing this sum as a binary number; (3) reversing the order of the last 3 bits of this binary number and (4) converting this reversed 3 bit number to an equivalent decimal type number. It should be understood that other verification code numbers and methods of deriving them are possible and within the spirit of the present invention.

Referring again to FIG. 2B, the output signals, from the digit sequence decoder 91, which are applied to the storage enabling terminals (E) of the storage registers 96, 97, 98 for the first, second, and third digit (room numbers digits) are also applied to three respective signal input terminals of an OR gate 103. The OR gate 103 provides an output signal to the signal input terminal 89 of AND gate 88 so that each of the 150 microsecond digit pulses from the output of AND gate 83 and representing the first, second, and third room number digits and present at the signal input terminal 87 of AND gate 88, are applied at the output of AND gate 88 to an input of a room number digit accumulator 104. The accumulator 104 sums or counts all of the pulses in the three room number digits and converts this sum to a binary number and provides as output signals the last 3 bits of the binary number.

Each bit of the 3 bit binary output signal from the accumulator 104 is supplied to respective first signal input terminals 105, 106, and 107 of the respective exclusive NOR gates 108, 109, and 110. Thus, for the room number 435 as illustrated in FIG. 6, the accumulator 104 would provide the last 3 bits of a binary number representing the sum of the room number digits and more specifically would provide a 1 at signal input terminal 105, a 0 at terminal 106, and a 0 at terminal 107 of the respective exclusive gates 108, 109, and 110 which are the last three bits of binary 12.

The verification digit storage register 99 provides at its output a 3 bit binary number representing the dialed verification code number. Each bit of this 3 bit signal from the storage register 99 is applied in reverse order to respective second signal input terminals 113, 112, 111 of the exclusive NOR gates 110, 109, and 108. Thus, for the verification code number 1 as illustrated in FIG. 6, binary inputs of 0, 0, 1 are applied to the respective signal input terminals 113, 112, and 111 of the exclusive NOR gates 110, 109, and 108.

In the above example of operation using the 435 room number and the proper verification code number 1, it is apparent that the exclusive NOR gates 108, 109, and 110 each provide identical signals to each of the signal input terminals of the AND gate 92 so as to provide a high level logic signal at the output of the AND gate 92 when the signal in interconnecting lead 114 from the end of the request decoder 78 is high. The exclusive NOR gates 108, 109, 110 and the AND gate 92 therefore operate as a comparator with the signal output of the AND gate 92 appearing on the lead 115, indicative of either proper or improper room number and verification code number, i.e. a valid or invalid subscriber request. The signal on lead 115 will be a high level signal when proper verification occurs. The signal output of the AND gate 92 inverted by the inverter amplifier 76 and supplied as an input signal to the input terminal 75 of OR gate 63 (FIG. 2A), via interconnecting lead 116. Thus, after the subscriber dialed request has been completed and if the subscriber room number and/or verification number are not proper, the signal at terminal 75 of OR gate 63 will initiate the error beep signal and the resetting of the ring detector and pulse circuits as previously described.

The binary signal output of the program digit storage register 100 representing the premium program requested by the subscriber, in addition to being supplied to the printer interface 93 for program number printout by printer 22, is also supplied to the input of a program digit decoder 117 (FIG. 2C) via the interconnecting leads 118. The program digit decoder 117 converts the binary coded number, representing the requested program, to an output signal on a predetermined one of a plurality of output lines 119–124. The output of the decoder 117 appears on one of the six output lines 119–124 depending upon the particular program number requested. The request for a program number 1 through 6 will appear as an output signal from the decoder 117 on a respective output line 119–124. Thus, as an example, a high level output signal will be provided on line 121 when the premium program number 3 has been requested as illustrated in FIG. 6.

Each one of the output lines 119–124 is connected to a first signal input terminal of a respective AND gate 125–130. The second signal input terminals of all of the AND gates 125–130 are common to one another and are connected to the output of AND gate 92 (FIG. 2B)

via the interconnecting line 115. A third signal input terminal of each one of the AND gates 125–130 is connected to a respective carrier detector 131–136 (FIG. 4) in the head end equipment 15 via a respective one of the interconnecting lines 137–142. As will be described herein later, a high level signal on any one of the lines 137–142 indicates that the head end equipment 15 is at the time providing to the coaxial cable distribution network 4 the respective premium television program. Therefore, when a high level signal is present on line 115, indicating proper correlation of the requesting room number and verification code number, any one of the AND gates 125–130 will provide a high level output signal whenever high level signals are also present at its first and third signal inputs. The signal outputs of the AND gates 125–130 are connected to and supply input signals to a respective one of program mono-stable multivibrators 143–148 which, in turn, supply input signals to OR gates 149–152. Each one of the program mono-stable multivibrators 143–148 provide an input signl to a selected pair of OR gates 149–152. The output of each OR gate 149–152 is connected to a V.C.O. control circuit 153–156. The operation of OR gates 149–152 and V.C.O. control circuits 153–156 is similar to that previously described for OR gate 45 and V.C.O. control circuit 50 and provide for the unclamping of the corresponding junctions points and the enabling of a respective generator 58, 157, 158, and 159. The unlabeled adjustable resistors shown in each of the control circuits 153–156 of FIG. 2C, operate the same as the adjustable resistor 54 in the previously described control circuit 50 and each adjustable resistor is adjusted to provide a predetermined signal output frequency from each respective voltage controlled oscillator 58, 157, 158, and 159 when enabled by its respective control circuit 153–156. For purposes of illustration it will be considered that the enabling tone output signal frequencies of $f_1, f_2, f_3$, and $f_4$ will be provided by the respective voltage controlled oscillators 58, 157, 158, and 159 when each is enabled by its respective control circuit 153, 154, 155, and 156.

The enabling of any two of the four voltage controlled oscillators 58, 157, 158, and 159 will provide six different possible tone combinations; therefore, six different premium programs may be made available for subscriber selection. In the embodiment described, the six available premium programs numbered 1 through 6 correspond to the enabling of the respective pairs of tone generators (58, 157); (58, 158); (58, 159); (157, 158); (157, 159); and (158, 159). In other words, the six available premium programs numbered 1 through 6 are represented by the respective pairs of output frequencies $(f_1, f_2)$; $(f_1, f_3)$; $(f_1, f_4)$; $(f_2, f_3)$; $(f_2, f_4)$; and $(f_3, f_4)$. As a summarizing example, when the premium program number 3 has been requested by the subscriber as illustrated by FIG. 6, a high level signal will be present on the output line 121 from the decoder 117 and line 139 from the carrier detector 133. These signals on lines 121 and 139 in combination with a high level verification signal on line 115 will cause the AND gate 127 to trigger the mono-stable MV 145. The output signal from the monostable MV 145 provides operation of the OR gates 149 and 152 thereby, in turn, providing for the unclamping of the respective control circuits 153 and 156 and the enabling of the V.C.O. tone generators 58 and 159. The pair of output signals, $f_1$ and $f_4$, from the respective V.C.O. tone generators 58 and 159 are provided as input signals to the tone amplifier 59 whereupon they are amplified and supplied as enabling signals or tones to the telephone lines 23 via the output transformer 41, interconnecting lines 60, relay 38, resistor 39 and line terminals 30. These enabling tones are supplied to the subscriber's telephone set 7 by the PABX system 3 and, in turn, supplied to the subscriber's room terminal 8 via the telephone pickup means 9 and signal cable 14.

The invention is not limited to the above illustrated number of output frequencies and more or less than the described four can be used with, of course, resulting changes in the number of different tone combinations available. In addition, the tone combinations need not be limited to pairs of tones and may, for example, comprise triplets or single tones. Generally, when pairs of tones are utilized the number of available different tone combinations (N) will have the following relationship to the number of individual tones (n):

$$N = (n^2 - n/2)$$

It should be noted that generator 58 serves a multipurpose function since it is used to provide an enabling tone $f_1$ as well as ready and error tones. Separate voltage controlled oscillators could of course be utilized for these purposes. In addition it should be understood that although four voltage controlled oscillators 58, 157, 158, and 159 are utilized in the disclosed embodiment to provide enabling tones, a greater or lesser number of such voltage controlled oscillators may be used with appropriate changes elsewhere in the system without departing from the scope and spirit of the present invention.

In FIG. 1, there is illustrated in block diagram a subscriber room terminal 8. The R.F. television signals which are generated at the head end equipment 15 are received at the R.F. signal input terminal 160 of the subscriber room terminal 8 by means of the coaxial cable distribution network 4, and the subscriber's line tap 5 and the interconnecting signal cable 10. The enabling tone signals generated by the control and monitoring station 21 and transmitted to the subscriber telephone set 7 are received at the enabling tone input terminal 161 by means of the telephone signal pickup means 9 and interconnecting cable 14. The antenna input terminals 11 of the subscriber's television set 6 are connected to the R.F. signal output terminal 162 of the subscriber's room terminal 8 by means of the antenna signal cable 12. The A.C. power line cord 13 of the subscriber's television set 6 is connected to the A.C. power output terminals 163 of the subscriber's room terminal 8. A.C. power input to the subscriber room terminal 8 is supplied from A.C. power mains (not shown) to the A.C. power input terminals 164 in FIG. 3. Included in the circuitry of the subscriber room terminal 8, but not shown, is a conventional power supply for providing D.C. operating voltages to the various circuitry illustrated in FIG. 3.

As previously disclosed, the R.F. television signals which are transmitted from the head end equipment 15 to the various subscriber room terminals 8 in the system, are comprised of both free and premium program channels. The subscriber room terminal 8, upon receiving enabling tones from the control and monitoring station 21, provides an automatic frequency conversion of a subscriber requested one of the premium program R.F. channels which is not normally receivable by the subscriber's television set 6, to a predetermined R.F. channel having a frequency which can be received by the subscriber's television set 6.

Now referring in more detail to FIG. 3, the enabling tones present at the enabling tone input terminal 161 are supplied to the input of a band pass filter 165. The band pass filter 165 operates to pass to its output, only those signals within the frequency range encompassed by the four signal output frequencies $f_1, f_2, f_3,$ and $f_4$ of the four voltage controlled oscillators 58, 157, 158, and 159 in the control and monitoring station 21. These signal output frequencies of the voltage controlled oscillators 58, 157, 158, and 159 are those signal frequencies supplied to the telephone line 23 by each respective V.C.O. when enabled by the unclamping of the junction points of the respective V.C.O. control circuits 153, 154, 155, and 156 as previously described. The band pass filter 165 thus eliminates from its output, undesired or spurious signals which may be present at the input terminal 161. The output signals of the band pass filter 165 are provided as input signals to each one of four enabling tone detector circuits.

Each enabling tone detector circuit operates to provide a D.C. output signal on its respective signal output line 170–173 whenever a signal is supplied to its input which is within the band pass frequency range of a respective band pass filter 174–177. In all other respects, the enabling tone detector circuits are substantially equivalent to one another. The respective amplifiers 178–181 provide amplification of input signals supplied from the band pass filter 165 and in addition provide circuit isolation or buffering between the band pass filter 165 and the respective individual band pass filters 174–177 of the enabling tone detector circuits. The detectors 182–185 can each comprise a simple diode detector circuit to detect an incoming enabling tone and provide a D.C. output voltage in response thereto.

In the disclosed embodiment of the present invention, the band pass filters 174–177 each operate to pass enabling tone frequencies different from one another. The band pass filter 174 operates to pass only the enabling tone $f_1$ generated by voltage control oscillator 58 in the control and monitoring station 21. Likewise the respective filters 175, 176 and 177 operate to pass only the respective enabling tones of $f_2, f_3,$ and $f_4$ which are generated by the corresponding voltage controlled oscillators 157, 158, and 159. Thus, the D.C. output signals which appear on the detector output lines 170, 171, 172, and 173 are indicative of the frequency of the enabling tones supplied to the input terminal 161 from the control and monitoring station 21. In other words, a D.C. output signal on the output line 170 indicates the presence of an enabling tone input signal $f_1$. Likewise, output signals on the lines 171, 172, and 173 indicate the presence of input signals having respective frequencies of $f_2, f_3,$ and $f_4$. Therefore, a specific pair of enabling tones corresponding to a requested premium program number for which the control and monitoring station 21 is responding, is identifiable by the D.C. output signals present on any two of the four output lines 170–173. As an example, a subscriber request for the premium program number 3, as illustrated in FIG. 6, will as previously described, result in the presence of a pair of enabling tones $f_1$ and $f_4$ at the input terminal 161 of the subscriber's room terminal 8. This pair of enabling tones $f_1$ and $f_4$ are passed by the band pass filter 165 and in turn supplied as input signals to each of the enabling tone detector circuits. Since only the enabling tone detector circuit 182 will respond to the enabling tone $f_1$ and detector circuit 185 to the tone $f_4$, a pair of D.C. output signals will be provided only on the corresponding output lines 170 and 173.

The output signals from the enabling tone detector circuits are supplied as input signals to a decoder. The decoder is comprised of AND gates 187–192 with each gate having a respective one of signal output lines 193–198. The output signals appearing on lines 170–173 from the respective enabling tone detectors are supplied to the AND gates 187–192 of the decoder such that for any particular pair of enabling tones to the input terminal 161 of the subscriber's room terminal 8, only one of the AND gates 187–192 corresponding to that pair of enabling tones, will provide an output signal on its corresponding signal output line. Thus in the aforementioned example for the subscriber request of program number 3, only the AND gate 189 will provide an output signal on its output line 195 since in this example, it is the only gate in the decoder which is supplied with simultaneous first and second signal inputs from any of the tone detectors. It should be noted that in the described embodiment, the presence of an output signal from the decoder on any one of the output lines 193-198 is related to a respective and corresponding one of the requested premium program numbers and its respective pair of enabling tones. For example, an output signal on line 193 is related to the premium program number 1; an output signal on line 194 is related to the program number 2 and so on up to and including output line 198 which relates to program number 6.

The signal output lines 193–198 of each respective AND gate 187–192 is supplied to a SET (S) input terminal of a respective program latch 199–204. Each program latch 199–204 upon receiving a SET input signal from its respective AND gate 187–192 latches to an ON state and remains in that state until receiving a signal at its RESET, (R) terminal at which time it returns to its RESET or OFF state. When any one of the latches 199–204 is latched to the ON state, a signal output from the respective latch 199–204 is supplied to a respective one of input terminals 205–210 of a converter control means. The latches 199–204 are identical to one another and each can comprise a conventional flip-flop type latch circuit operating with high level input signals and providing high level output signals.

The converter control means operates to provide a selected one of a number of presetable D.C. voltage levels at the control voltage input terminals 212, 213 of the voltage tuned premium channel R.F. converter 214 in response to the application of an input signal to a particular one of a corresponding number of signal input terminals 205–210.

The converter control means in the embodiment shown in FIG. 3 is comprised of six adjustable D.C. voltage divider circuits with each one of the divider circuits corresponding to each one of the six input terminals 205–210. Each one of the six divider circuits is comprised of an adjustable resistor 215 connected in series with a single common resistor 216. Each of the six divider circuits further comprises transistor switch 217 with its collector-emitter path connected in series with the corresponding adjustable resistor 215. Each one of the six series connected adjustable resistors 215 and corresponding transistor switches 217 are connected in parallel with one another. This parallel combination is, in turn, connected in series with the common resistor 216. The resulting series-parallel combination of the six adjustable voltage divider circuits and the common resistor 216 is in turn connected in parallel with a D.C. voltage source at terminals 218, 219. The base element of each of the transistor switches 217 is connected to its corresponding signal input terminal 205–210.

In operation of the converter control means, each one of the transistor switches 217 is biased to be normally non-conducting with no signal input at its corresponding input signal terminal 205–210. The application of an input signal to any selected one of the input terminals 205–210, will cause the corresponding transistor switch 217 to be driven into conduction, thereby causing the voltage divider comprised of the corresponding adjustable resistor 215 and the common resistor 216 to be connected across the D.C. voltage source at terminals 218, 219. The resulting D.C. voltage level existing between the junction point of the voltage divider resistors 216, 215, and the D.C. source terminal 219 is applied to the varactor control voltage terminals 212, 213 of the converter 214. Since this voltage level is a function of the ratio of the resistance of the voltage divider resistors 216, 215, the voltage level applied to the terminals 212, 213 of the converter 214 can be preset to a desired value by adjustment of the resistor 215. Therefore, the converter control means shown in FIG. 3 can provide any one of six different preset voltage levels by the application of an input signal to a corresponding one of the six signal input terminals 205–210 from the corresponding latches 199–204.

The premium channel R.F. converter 214 provides for the frequency conversion of all of the incoming premium program channels applied at the R.F. input terminal 160, to a single output channel frequency at the R.F. output terminal 162. Thus any incoming premium program channel located between channels 6 and 7 of the standard V.H.F. television band can be converted to a single output channel such as for example, the standard television channel 12.

The premium channel R.F. converter 214 can be of conventional and well known design which utilizes voltage controlled capacitors or varactors for the control and adjustment of frequency. The application of selected levels of D.C. voltage at the terminals 212, 213 provide for the tuning of the converter so as to enable the conversion of the available incoming premium program channels to a predetermined output channel which can be received by the subscribers television set 6. Each of the adjustable resistors 215 of the converter control means can therefore be preset to provide a voltage level at terminals 212, 213 to cause the converter 214 to tune to a different and desired incoming premium program channel. Each of these voltage levels are selected by the application of a signal to a selected one of the input terminals 205–210 as previously described. In the aforementioned operational example where an output signal, from the latch 201 representing the requested premium program number 3, was applied to the input terminal 207 of the varactor control means, the resulting present D.C. voltage level applied to converter terminals 212, 213 is such to cause the converter 214 to be tuned to the incoming midband premium program channel for the requested premium program number 3. It will be understood by those skilled in the art that the function of the above described voltage control means can also be provided, if desired, by control circuitry similar to that used in the control and monitoring station 21 and previously described in relation to the V.C.O. control circuits 153–156 and the associated OR gates 149–152 of FIG. 2C.

The R.F. filter 220 provides a low impedance signal path from the R.F. input terminal 160 to the R.F. output terminal 162 for incoming television channels other than the premium program channels. In the described embodiment for example, the V.H.F. channels 2 through 6, 7 through 13 would be passed with little or no attenuation from the R.F. input terminal 160 to the R.F. output terminal 162. The R.F. filter 220 thus is a low impedance shunt across the premium channel converter 214 for R.F. channels other than the midband premium channels. The R.F. filter 220 may of course be an integral part of the converter 214 and can be a hybrid filter or the like. The function of the R.F. filter 220 can also be provided by a frequency selective signal splitter whereby only those incoming signals at the R.F. input terminal 160 which are within the frequency band used for transmission of the premium program channels, are routed to the input of the premium program converter 214 and whereby all other signals are routed directly to the R.F. output terminal 162.

The subscriber room terminal 8 also includes circuitry for providing reset signals to the RESET, (R) signal terminals of each of the latches 199–204. Output signals from each of the six AND gates 187–192 are supplied as input signals to an OR gate 221. An output signal from a television set load sensor 222 is also supplied as an input signal to the OR gate 221 via the sensor signal output line 223. The output signal from the OR gate 221 is applied to the input of a signal differentiator 224. The output of the signal differentiator 224 is applied simultaneously to the RESET, (R) signal input terminals of all of the latches 199–204.

The above described reset signal circuitry operates to provide a momentary reset signal to each of the latches 199–204, each time an output signal appears at the output of any one of the AND gates 187–192 or each time that the subscriber television set is turned off. The television set load sensor 222 provides a normally low level signal on its output line 223 when the television set is ON, i.e. when the A.C. power switch is in the ON position. Each time the television set 6 is turned OFF by the subscriber the load sensor 222 provides a high level signal to the OR gate 221 via the output line 223. The OR gate 221 provides a high level output signal to the differentiator 224 whenever a high level signal is applied to any of its inputs. The differentiator 224 differentiates its input signal from the OR gate 221 and provides a short duration high level pulse to the RESET, (R) terminals of the latches 199–204. The differentiator 224 can be a conventional RC type differentiator whereby the output of the OR gate 221 is capacity coupled to the RESET, (R) terminals or it can be a digital type differentiator circuit such as comprised of an exclusive OR gate having one of its two inputs connected directly to the output of the OR gate 221 and its other input connected to the output of the OR gate 221 through a momentary delay device such as one or more non-inverting amplifiers. The signal output pulse obtained from the output of the exclusive OR gate is of course supplied to the latches 199–204 as reset signals. It is a requirement of the differentiator 224 that it provide an output signal pulse with a time duration much less than the duration of the incoming enabling signals supplied to the input terminal 161 of the subscriber's room terminal 8. As an example, the reset pulse width in one embodiment was approximately 5 microseconds compared to the enabling tone duration of several milliseconds. Since the latches 199–204 normally cannot be latched by signals on the SET, (S) input terminals while there is a signal present on the RESET, (R) terminal, the purpose of a short duration reset pulse signal is obvious.

The television set load sensor 222 in one simple form can comprise an electromagnetic relay 225 and a source of D.C. voltage 226. The electromagnetic coil of relay 225 is connected in series with one lead 227 of the A.C. power line cord 13 which supplies A.C. power to the subscriber's television set 6. In the normal operating condition and with the power switch of the subscriber's television set in the ON position, load current causes the relay 225 to be energized thereby supplying a low level signal to the OR gate 221 via the output line 223 and relay contact 228. When the subscriber's television set is turned OFF, the relay 225 is de-energized and a high level signal is supplied to the OR gate 221 via the output line 223 and relay contact 229 from the D.C. voltage source 226. The load sensor shown in FIG. 3 is by way of example only and many other suitable circuits may be used which will be obvious to those skilled in the art, to sense the ON-OFF condition of the subscriber television set and to provide the necessary input signal to the OR gate 221 in response thereto.

There is shown in FIG. 4, a typical head end equipment 15 which can be used in the herein disclosed television signal distribution system of the present invention to provide R.F. television channel output signals in the standard V.H.F. television frequency band as well as in the mid-band V.H.F. range. The output signals from the head end equipment 15 are supplied to the coaxial cable distribution network 4 for distribution to the various guest rooms and subscriber room terminals in the system. The head end equipment 15 is comprised of various R.F. signal carrier generators, modulators, R.F. signal combiners and the like which are conventional and well known in the C.A.T.V. art and are therefore not described in detail. The carrier detectors 131–136 which are shown as part of the head end equipment 15, although conventional in design, are not normally included in commercially available C.A.T.V. head end equipment and will be described herein later.

The various signal inputs to the input terminals 230–238 of the head end equipment 15 shown in FIG. 4 are illustrative examples of what can be utilized in a typical installation of the present invention for distribution of programs to the subscriber rooms and room terminals; the invention, however, is not limited thereto. Radio frequency signals from television broadcast stations can be provided at the signal input terminals 230 and 231. These R.F. input signals at the input terminals 230, 231 can be supplied by the head end equipment 15 to the coaxial cable network 4, either converted or unconverted in channel frequency as may be desired. Video and accompanying audio signals can be provided at the signal input terminals 232–238. These signals supplied to the input terminals 232–238 are of course used to modulate R.F. carriers generated within the head end equipment 15. The frequencies of these generated carriers can of course be located in the standard V.H.F. band and/or the midband range as may be desired. As illustrative examples, the signals provided at input terminals 230–232 are used as free program material whereas those signals at the input terminals 233–238 are used as premium program material. It is to be understood that although the described embodiment of the control and monitoring station 21 and the subscriber room terminal 8 both have the capability of six separate premium program channels, a greater or lessor number can be provided. It should be understood that the head end equipment 15 shown in FIG. 4 can be modified by those skilled in the art, to provide additional premium program channels as necessary.

The carrier detectors 131–136 operate to provide output signals on their respective output signal lines 137–142 which output signals are indicative of whether or not the respective premium program channel carriers or signals are being generated and supplied by the head end equipment 15 to the coaxial cable distribution network 4, for distribution to the subscriber rooms.

The carrier detectors 131–136 are identical to one another and each one can comprise a simple R.F. diode detector circuit to detect the presence of a R.F. carrier signal at the output of a respective premium program R.F. carrier generator and in turn provide a high level output signal on its respective output line 137–142 which output signal is indicative of the presence of the respective premium program R.F. carrier signal. The output signals from the carrier detectors 131–136 are supplied to the control and monitoring station 21 by the respective signal lines 137–142 and can be utilized by the control and monitoring station 21 to prevent the processing and consequent billing of a subscriber request for a premium program channel which, at the time of the subscriber request, is not being generated or transmitted by the head end equipment 15. It will be apparent to those skilled in the art that means other than carrier detectors may be used to provide the described signals to the control and monitoring station 21. In addition, the carrier detectors 131–136 can be omitted if desired, in which case each one of the AND gates 125–130 (FIG. 2C) would be replaced by a two input AND gate and the interconnecting leads 137–142 omitted.

FIG. 5 illustrates and summarizes in pictorial form the dialing sequence of a typical subscriber request for a premium program including the relative positions of the various tones involved in such a request, all of which have been previously described in detail in relation to the operation of the disclosed embodiment of the invention.

FIG. 6 illustrates a typical paper tape printout or record of a typical subscriber premium program request as supplied by the paper tape printer. Although the time and date of the request is not illustrated in this figure, it should be understood that such information can be contained in the printed record.

Although the present invention has been described in relation to a particular embodiment by way of example, it should be understood that it is illustrative of the invention and its use and is not restrictive thereof. In addition, a public automatic telephone exchange can be used, if so desired, in lieu of the private automatic telephone exchange shown herein. The premium program television signals can originate from locations other than the central station shown in FIG. 1. The system can be integrated with an external or separate public cable television system whereby some or all of the free and/or premium television programs are supplied by the public cable system either to the head end equipment 15 or directly to the subscriber terminal 8. The enabling signals generated by the control and monitoring station 21 can also be used to enable unscramblers or other types of premium program decoders.

It is reasonable to expect that those having ordinary skill in the art can make numerous other modifications and adaptations of the disclosed invention without departing from the spirit of the invention. It is intended that such modifications and adaptations of the invention will be within the scope of the following appended claims.

What is claimed is:

1. A control and monitoring device for use in a telephone interfaced subscriber television system for receiving from a telephone exchange system subscriber initiated telephone signals and for supplying signals to the automatic telephone exchange system including enabling signals peculiar to the telephone signals, comprising:

first means having an input for receiving the telephone signals from the automatic telephone exchange system including a pulse train consisting of a predetermined number of one or more pulses, said pulse train representing a subscriber request for a particular television program signal, and responsive to the predetermined number of said one or more pulses in the pulse train for providing an output signal on a predetermined one of N number of separate outputs; and second means connected to said first means and responsive to the output signal on the predetermined one of the N number of separate outputs of said first means for providing simultaneous output signals on a predetermined number of n number of separate outputs; and third means including an enabling signal source for selectively generating simultaneously the predetermined number of n number of enabling signals each signal having a different signal frequency, said third means having an output adapted to be connected to the automatic telephone exchange system for supplying the enabling signals to said system and connected to said second means and responsive to the output signals on the predetermined number of the n number of separate outputs of said second means for providing at the output of said third means the predetermined number of the n number of enabling signals from said enabling signal source whereby said predetermined enabling signals are a function of the number of pulses in said pulse train.

2. The control and monitoring device of claim 1 wherein the relationship between N and $n$ is $$N = (n^2-n)./2$$

3. The control and monitoring device of claim 1 wherein the first and second means further comprises:

a counting means for counting the number of pulses in said pulse train and providing a binary code output signal representing a binary number equivalent to the number of counted pulses in said pulse train;

a decoding means for converting the binary code output signal of said counting means to an output signal on a predetermined one of a number of separate outputs whereby the presence of an output signal on any one of the separate outputs is a function of the number of pulses in said pulse train; and a gating means including a number of separate gates each one of said separate gates having an output and at least two inputs, said inputs adapted to receive the output signal from a different one of the separate outputs of said decoding means for providing an output signal from at least a predetermined one of said number of separate gates.

4. The control and monitoring device of claim 3 and further comprising:

means for effecting subscriber access to the control and monitoring device and adapted to be connected to the telephone exchange system for receiving the telephone signals including a ringing signal representing a subscriber request for access and including a ringing signal detector for detecting the ringing signal and providing a signal receivable by the telephone system indicative that the control and monitoring device has answered said ringing signal for effecting a termination of the ringing signal.

5. A control and monitoring device for use on a telephone interfaced subscriber television system for receiving from a telephone exchange system subscriber initiated telephone signals and for supplying signals to the telephone exchange system including enabling signals peculiar to certain of the said subscriber initiated telephone signals, said subscriber initiated telephone signals including a plurality of separate pulse trains, each separate train of said plurality of separate pulse trains having at least one electrical pulse, the pulse in a predetermined at least one of the separate trains in the plurality representing a respective one of a subscriber identification code number, a subscriber verification code number, and a subscriber television program request code number, said subscriber verification code number having a predetermined relationship to said subscriber identification code number, the control and monitoring device comprising:

a signal input means adapted to be connected to the telephone exchange system for receiving from the system the subscriber initiated telephone signals;

a first pulse counting means connected to the input means for summing the number of pulses in the predetermined at least one pulse train representing the subscriber identification code number and providing a binary output signal, said output signal being a binary representation of the summed pulses;

a second pulse counting means connected to said input means for counting the number of pulses in each separate one of the predetermined at least one pulse train representing the subscriber verification code number and providing a binary output signal, said output signal being a binary representation of said subscriber verification code number;

a comparator means connected to said first and second pulse counting means for comparing said binary output signals and providing an output signal indicative of the predetermined relationship of the subscriber identification code number and the subscriber verification code number;

a third pulse counting means connected to said input means for counting the number of pulses in each separate one of the predetermined at least one pulse train representing the subscriber television program request code number and providing a binary output signal, the output signal being a binary representation of said subscriber television program request code number;

means including a binary decoder and connected to said comparator means and the third pulse counting means and responsive to the binary output signal of the third pulse counting means and the output signal of the comparator means for providing an output signal on a predetermined one of several output lines;

an encoder having a predetermined number of outputs and having inputs connected to the predetermined number of output lines of said last mentioned means and responsive to the output signal on the predetermined one of several output lines of said means including a binary decoder for providing output signals on predetermined ones of the predetermined number of outputs;

an enabling signal generator for selectively providing one or more enabling signals, each one of said signals having a characteristic different from the others, the enabling signal generator having an output and at least two enable inputs for selecting said one or more enabling signals, each one of the inputs connected to a different one of the outputs of said encoder and responsive to the output signals on the predetermined ones of the outputs of said encoder for providing predetermined enabling signals at said output; and a signal output means connected to said enabling signal generator and adapted to be connected to the automatic exchange system for supplying to said system enabling signals.

6. The control and monitoring device of claim 5 further comprising:

a fourth pulse counting means connected to said input means for counting the number of pulses in each separate one of the predetermined one or more pulse trains representing the subscriber identification code number and providing a binary output signal, said output signal being a binary representation of said subscriber identification code number;

a storage means connected to said second, third, and fourth pulse counting means for storing each of the binary output signals representing the respective subscriber verification. program request, and identification code numbers; and means connected to said storage means and adapted to be connected to a recording means for providing to said recording means signals representing said subscriber code numbers.

* * * * *